United States Patent [19]

Kogawa

[11] 4,348,731

[45] Sep. 7, 1982

[54] AUTOMATIC WORKING APPARATUS AND METHOD OF CONTROLLING THE SAME

[75] Inventor: Takashi Kogawa, Sakura, Japan

[73] Assignee: Hitachi, Ltd., Tokyo, Japan

[21] Appl. No.: 31,301

[22] Filed: Apr. 18, 1979

[30] Foreign Application Priority Data

Mar. 5, 1979 [JP] Japan ................................. 54-24514

[51] Int. Cl.³ ...................... G06F 15/46; G05B 15/00
[52] U.S. Cl. .................................... 364/513; 364/174; 414/730; 414/735
[58] Field of Search ............... 364/110, 115, 118, 120, 364/478, 513; 198/339, 575; 414/730, 733, 735

[56] References Cited

U.S. PATENT DOCUMENTS

| | | | |
|---|---|---|---|
| Re. 28,437 | 6/1975 | Devol et al. | 198/339 |
| Re. 30,016 | 5/1979 | Hohn | 364/118 |
| Re. 30,132 | 10/1979 | Irie | 364/513 |
| 3,958,109 | 5/1976 | Doherty et al. | 364/114 |
| 4,068,156 | 1/1978 | Johnson et al. | 364/478 |
| 4,086,522 | 4/1978 | Engelberger et al. | 364/478 |
| 4,156,835 | 5/1979 | Whitney et al. | 364/513 |

*Primary Examiner*—Felix D. Gruber
*Attorney, Agent, or Firm*—Craig and Antonelli

[57] ABSTRACT

An automatic working apparatus having a route-controlled object to be controlled in respect of the route along which the object is moved is controlled by a point-to-point control system in which coordinates of three successively given bend points are used for automatically determining a bend angle at one of the given bend points and for automatically controlling the speed of the route-controlled object at the one given bend point as a function of the bend angle.

11 Claims, 8 Drawing Figures

AUTOMATIC WORKING APPARATUS AND METHOD OF CONTROLLING THE SAME

BACKGROUND OF THE INVENTION

1. Field of the Invention

The present invention relates to an automatic working apparatus incorporating a play-back control function and a method of controlling the automatic working apparatus.

2. Description of the Prior Art

A control in which coordinates of bend points in a path or route to be followed or traced by an object which is controlled in respect of the moving path or route thereof and herein referred to as the route-controlled object are stored in a memory device and read out sequentially thereby to guide the route-controlled object along a substantially straight line segment has been known and referred to as the point-to-point control (or P.T.P. control in an abridgement). In this connection, the route-controlled object is a part of an automatic working apparatus and is usually constituted by a portion adapted to perform a treatment on a work or a portion positioned near the working portion. Further, the term "work" is intended to mean an article or thing destined to be worked, machined, transported or subjected to similar treatment or processing by the automatic working apparatus. For example, in the case in which the automatic working apparatus is a painting machine, then the work is a subject to be applied with a paint material.

In the automatic working apparatus, a high positional accuracy of the route along which the route-controlled object is displaced as well as a high speed at which the route-controlled object is moved are required. When the route-controlled object is moved from a bend point at which the moving direction is changed to a next bend point, the route-controlled object is progressively accelerated starting from the first mentioned bend point and decelerated progressively as the route-controlled object approaches to the next bend point. The commands for changing the moving speed of the route-controlled object are conventionally issued on the basis of operator's judgement. Consequently, the teaching procedures become necessarily troublesome and there may be produced erroneous speed commands.

SUMMARY OF THE INVENTION

An object of the invention is to provide an automatic working apparatus in which the speed commands are automatically produced by the bend points.

Another object of the invention is to provide a method of controlling the automatic working apparatus in which the speed commands can be produced automatically by the bend points.

DESCRIPTION OF THE PREFERRED EMBODIMENTS

Figure 1:
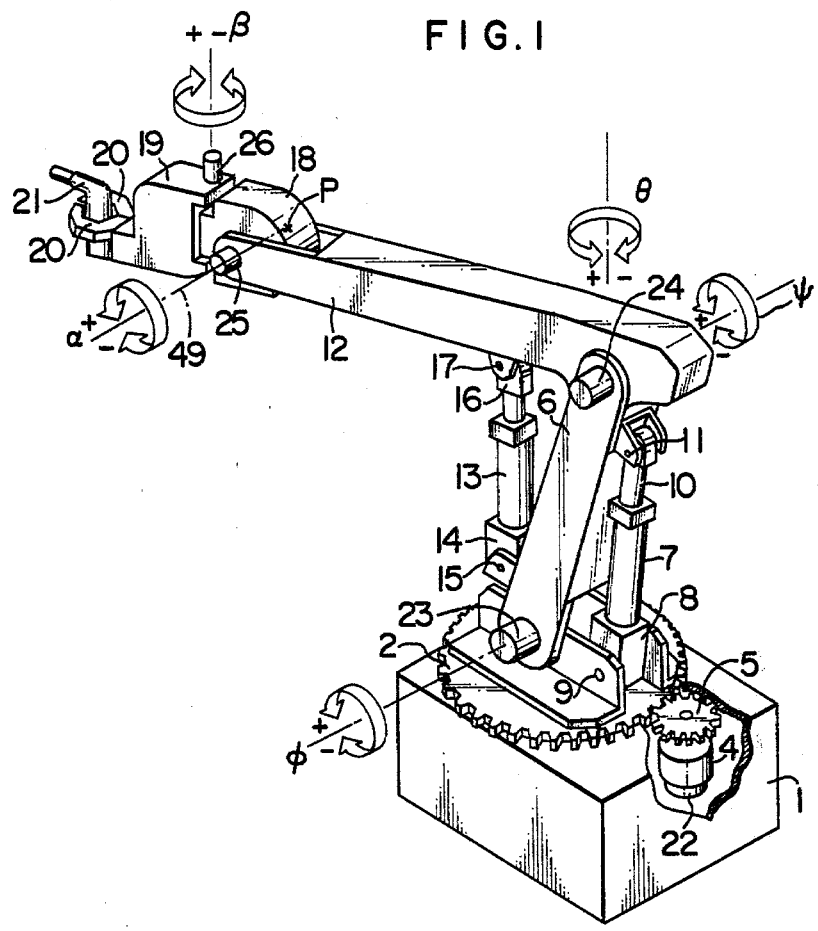
FIG. 1 is a perspective view showing a mechanical structure of an automatic working apparatus according to an embodiment of the invention with portions being broken away.

The automatic working apparatus according to the invention operates on the basis of the principle described below. The invention starts from the fact that the speed of the route-controlled object at a position on the path thereof preceding to a given bend point may be determined in dependence on the bend angle by which the moving direction of the route-controlled object is to be varied at that given bend point. More specifically, the speed of the route-controlled object approaching to the bend point must be correspondingly decreased for a larger bend angle, while the speed of the route-controlled object need not be decreased significantly when the bend angle at the next bend point is relatively small. The value of the bend angle can be easily arithmetically determined on the basis of the coordinates of three bend points, i.e. the coordinates of the next bend point at which the moving direction of the route-controlled object is to be changed and the coordinates of the bend point which precedes and succeeds, respectively. Such arithmetical determination is executed for every bend point. The results of the arithmetical determination executed in the teaching mode of operation are stored in a memory or storage device and may be read out in any suitable manner in the play-back control mode to be utilized as the speed commands or alternatively coordinates of three bend points in a group are read out from the memory device to be used for arithmetical determination of the bending angle from which the speed command for the intermediate bend point is then prepared and produced. In the former case, although the memory device having a greater storage capacity as compared with the latter case, an advantage is obtained that the arithmetical determination of the bend angles need not be executed for every play-back control. On the other hand, in the latter case, the arithmetical operations for determining the bend angle are required for every play-back. However, the memory device may be of a relatively small storage capacity.

For the speed control of the route-controlled object in dependence on the value of the bend angle, the speed v of the route-controlled object at the time passing by the given bend point can be made in reverse proportion to the bend angle δ at that bend point. Further, the speed v may be varied in a stepped manner as a function of the bend angle δ.

When the bend points to be sequentially passed by the route-controlled object are spaced from one another for a significatnly great distance, the speed v may be determined only in conjunction with the bend angle δ. However, if the distance between the first bend point to be immediately passed by the route-controlled object and the second bend point to be passed in succession is relatively short, the speed v can not be determined with a reasonable accuracy only on the basis of the bend angle $\delta_1$ at the first bend point, because the route-controlled object can not be decelerated sufficiently before reaching the second bend point and will deviate from the programmed path particularly when the bend angle $\delta_2$ at the second bend point is large. In order to avoid such an inconvenience, the speed v of the route-controlled object is determined not only from the bend angle at the first bend point but also in consideration of the distance between the first and the second bend point. In summary, when the distance between the first and the second bend points is sufficiently long, the speed v of the route-controlled object at the time when it passes by the first bend point is determined as a function of only the bend angle $\delta_1$ at the first bend point. On the other hand, when the distance between the first and the second bending points is short, the speed v of the controlled object at the first bend point is reduced even if the bend angle $\delta_1$ thereof is small. Namely, an arithmetical operation unit for realizing the following equation is employed thereby to determine the speed v in inverse proportion to the result of the arithmetical operation $$k\delta_1 \times 1/l \tag{1}$$

where l represents the distance between the first bend point to be next passed by the route-controlled object and the second bend point to be passed in succession, $\delta_1$ represents the bend angle at the first bend point, and k represents a coefficient.

In the case in which the automatic working apparatus includes at least a rotatable portion and the route-controlled object is driven through the rotatable portion, there are employed encoders, transducers, potentiometers or the like for detecting the attitude of the movable parts, i.e. the position of the route-controlled object. The output signals available from the attitude detector means are utilized for arithmetically determining the coordinates of the route-controlled object. The individual movable parts or the drive means are controlled so that the above arithmetically determined coordinates may be located on or adjacent to the straight line interconnecting the two bend points as previously taught or programmed, thereby to move the route-controlled object from one bend point to the next one. The arithmetic operation for determining the coordinates of the route-controlled object is executed in synchronism with the sampling pulses which may be preferrably produced at a predetermined periodical rate. The magnitude of the speed command for moving the route-controlled object during each sampling period is progressively decreased for the deceleration command and progressively increased for the acceleration command. It is equally possible to control the speed of the route-controlled object by progressively elongating the duration of the sampling period for the deceleration command and shortening progressively the sampling period for the deceleration command in the case in which the displacement of the route-controlled object during every sampling period is constant. The speed of the route controlled object can be controlled by the output signal from a speed pattern generator which may be constituted by an up-down counter. When the acceleration command is issued, the contents of the up-down counter is progressively increased and the counting is stopped after a predetermined time elapse. The attained count is held until the deceleration command is produced, whereupon the output from the up-down counter serving as the speed pattern generator is progressively decreased.

In this manner, according to the invention, the speed commands are automatically issued by merely defining the bend points instead of issuing the commands on the basis of the judgement of the operator. In the case of the prior art control system for the automatic working apparatus, the route-controlled object will tend to deviate from the prescribed route and undesirable shock will be applied to the driving mechanism, when the vector of velocity changes remarkably at a bending point. However, since the speed command for the route-controlled object is determined on the basis of the bend angle alone or two factors of such a bend angle and the distance between the bend points according to the teachings of the invention, appropriate speed can be assured for the route-controlled object while suppressing significantly shocks applied to the driving and/or supporting mechanism.

Referring to an embodiment of the present invention shown in FIG. 1, numeral 1 denotes a stationary base on which a disk-like table 2 having teeth 3 formed along the peripheral edge is rotatably mounted. An electric motor 4 is installed in the base or platform 1 and has an output shaft on which a pinion gear 5 is fixedly secured. Through the meshing of the pinion gear 5 with the teeth 3, the table 2 can be rotated about a vertical revolution axis in the directions $\ominus$ as indicated by a double-head arrow to enable movement in the X direction. A first arm 6 is pivotally connected to the rotatable table 2 by a pin (not shown). To this end, a mounting bracket may be provided on the table 2 as schematically illustrated in the figure. A hydraulic actuator 7 having a base portion 8 connected pivotally to the table 2 by a pin 9 extends vertically and has an actuator rod 10 which is pivotally connected to the first arm 6 at an upper end portion thereof. Through the actuation of the hydraulic actuator 7 the first arm 6 can be swung in the direction $\phi$ about a horizontal axis as indicated by a double-head arrow to enable movement in the X direction. A second arm 12 is swingably connected to the first arm 6 at an upper end thereof by a pin (not shown). A second hydraulic actuator 13 having a base portion 14 pivotally connected to the first arm 6 at a lower end portion thereof by a pin 15 has an actuator rod 16 which in turn is pivotally connected to the second arm 12 at an intermediate portion thereof by a pin 17. Through operation of the second hydraulic actuator 13, the second arm 12 can be rotated in the direction $\psi$ to enable movement in the Z direction. Mounted at the free end of the second arm 12 is a first swing motor 18 which is rotatable in the direction $\alpha$ around a horizontal swing axis. A second swing motor 19 is mounted on the first swing motor 18 so as to be rotatable in the direction $\beta$ about a swing axis extending perpendicular to the swing axis of the first swing motor 18. A pair of holding fingers 20 is mounted on the second swing motor 19 for holding a spray gun 21 for painting. Reference numeral 22 denotes a position detector for detecting the position of the rotatable table 2 relative to the base 1. The position or attitude of the first arm 6 relative to the rotatable table 2 is detected by a position detector 23, while the position or attitude of the second arm 12 relative to the first arm 6 is detected by a position detector 24. Further, the attitude of the first swing motor 18 relative to the second motor 19 is detected by a position detector 25, while the attitude of the second swing motor 19 relative to the first swing motor 18 is detected by a position detector 26.

The automatic working or painting apparatus of the structure described above is merely an example to which the invention can be applied. The essential feature of the invention does not reside in such automatic working apparatus itself but in a control apparatus for controlling the working apparatus. Accordingly, the invention is never restricted to the automatic painting apparatus shown in FIG. 1 but can be applied to any other automatic working apparatus where the route along which the tool or other working or treating means is displaced is to be automatically controlled. For example, the invention can be equally applied to an automatic welding apparatus. In this case, the spray gun 21 held by the fingers 20 may be simply replaced by a welding torch.

Figure 2:
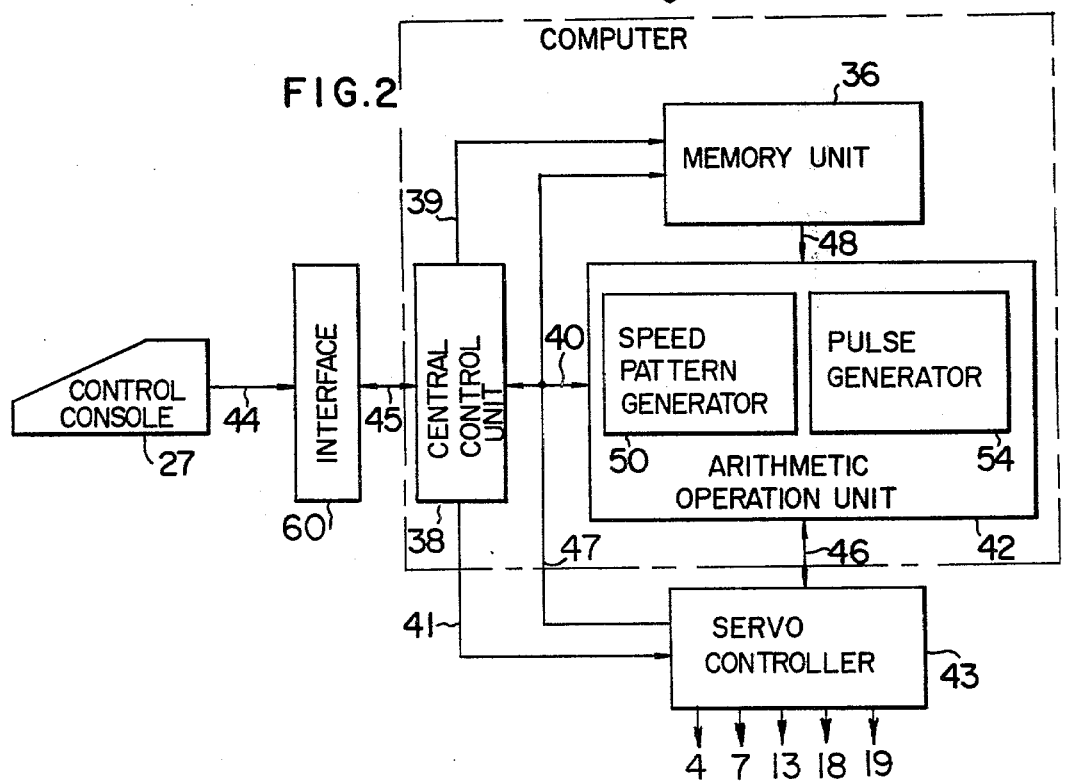
FIG. 2 is a block diagram showing a control system for an automatic working apparatus according to an embodiment of the invention.
Figure 3:
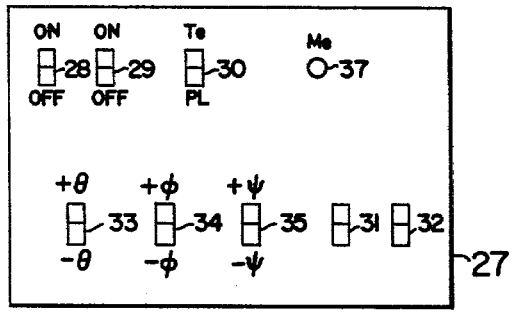
FIG. 3 is a view to show a control panel of a console.

An exemplary embodiment of the control apparatus according to the invention is schematically shown in a block diagram in FIG. 2. In this figure, reference numeral 27 denotes a console which is provided with a power switch 28 for turning on or off the power supply to the working apparatus shown in FIG. 1, a switch 29 to start a hydraulic pump for actuating the hydraulic actuators 7 and 13 as well as the first and second swing motors 18 and 19, and mode change-over switch 30 for changing over the teaching mode and the play-back mode to each other, as illustrated in FIG. 3. A switch array for the teaching mode includes three-position change-over switches 31 and 32 for driving the first and second swing motors 18 and 19 in one direction (referred to as the plus direction as indicated by a plus sign in FIG. 1) or in the other direction (referred to as the minus direction in the same sense) thereby to determine the positions or attitudes of these motors, three-position change-over switches 33, 34 and 35 for moving selectively a route-controlled object (concrete example of which will be described hereinafter) in the directions +X; −X; +Y; −Y and +Z; −Z, and a button switch 37 depressed when teaching points or bend points are to be written in a memory unit or storage 36, as described hereinafter. The console 27 is connected to a central control unit 38 of a computer through an interface unit 60. The central control unit 38 is operated to control the memory unit 36, an arithmetic operation control unit 42 and a servo controller 43 through bus lines 39, 40 and 41. Assuming that the switch 30 is changed over to the position Te for the teaching mode and one of the change-over switches 33 to 35, say the switch 33 is turned to the position $+\theta$, then the corresponding signal is supplied to the arithmetic operation logic 42 through the lines 44, 45 and 40, whereby the arithmetic operation control unit 42 executes the arithmetic operations required to move the route-controlled object in the direction $+\theta$ as described hereinafter. The result of the executed arithmetic operation is sent to the servo controller 43 through the line 46, as the result of which the electric motor 4 as well as the hydraulic actuators 7 and 13 are correspondingly operated to move the route-controlled object in the direction $+\theta$. When the route-controlled object has attained a desired coordinate position, the change-over switch 33 is reset to a neutral position, whereupon the controlled object is caused to stop at that position. Subsequently, the write-in button 37 is depressed, whereby the output signals from the position or attitude detectors 22 to 26 are supplied to the memory unit 36 through the line 47. When the write-in operation has been completed, the button switch 37 is restored to the original position. A similar teaching process is repeated to store in the memory unit the bend points at which the moving direction of route-controlled object is to be changed. After the completion of the teaching processes, the change-over switch 30 is returned to a neutral position. For the play-back control, the change-over switch 30 is turned to the position labelled as PL. Then the data about the bend points stored in the memory unit 36 is read out and supplied to the arithmetic operation unit 42 through the line 48, whereby the arithmetic operations for moving the route-controlled object along straight line segments between the bend points are executed, the results of which are transferred to the servo controller 43 through the line 46. Consequently, the route-controlled object is caused to move from the one bend point to the next bend point as designated in the teaching process by means of the electric motor 4 and the hydraulic actuators 7 and 13 in response to the outputs of the servo controller 43.

In the operation described above, the route-controlled object may be of course the tip end of the spray gun shown in FIG. 1. However, in this case, five factors $\theta$, $\phi$, $\psi$, $\alpha$ and $\beta$ have to be determined in order to move the route-controlled object or the spray gun 21 from a given coordinate bend point to other bend point. Then, the arithmetical operations as involved will become very complicated. For this reason, in the case of the illustrated embodiment, the factors $\alpha$ and $\beta$ are assumed to be constant for the displacement of the controlled object from one bend point to the next one with only the factors $\theta$, $\phi$ and $\psi$ being determined by the arithmetical operation unit 42. Accordingly, the route-controlled object is considered to be a point P located on the axis 49 of the first swing motor 18 in the case of the illustrated embodiment.

Figure 4:
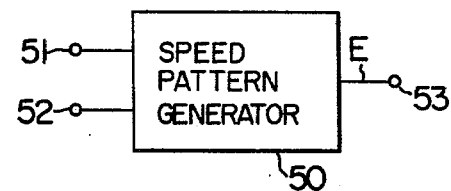
FIG. 4 is a block diagram showing a speed pattern generator according to an embodiment of the invention.
Figure 5:
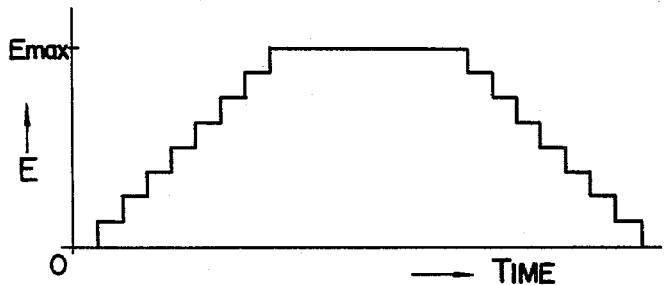
FIG. 5 is a signal wave diagram illustrating the output state of the speed pattern generator shown in FIG. 4.
Figure 6:
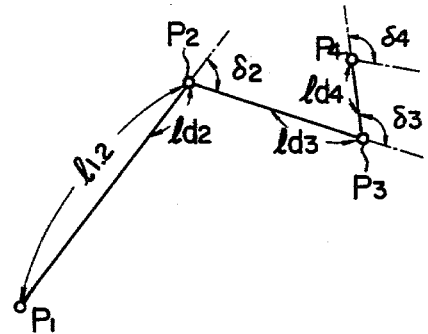
FIG. 6 is a chart illustrating taught bend points of a route-controlled object.

The arithmetical operation unit 42 incorporates therein a speed pattern generator 50, as schematically shown in FIG. 4. The speed pattern generator 50 has an acceleration command signal input terminal 51, a deceleration command input terminal 52 and an output terminal 53. When the acceleration command input signal is applied to the terminal 51, the output signal E appearing at the output terminal 53 is progressively increased in a step-up manner as a function of time, as is illustrated in FIG. 5. The output signal E becomes constant at a certain value $E_{max}$ (saturated level) and remains at this maximum level until the deceleration command signal is applied to the associated input terminal 52. In response to the deceleration command, the output signal E decreases progressively in a step-down manner to ultimately attain the zero level. When the deceleration command signal is applied to the terminal 52 before the maximum or saturated level $E_{max}$ has been attained, then the output signal E begins to decrease progressively to zero without going up to the maximum level. On the other hand, upon application of the acceleration command signal to the input terminal 52 before the output signal E has decreased to zero, the output signal E starts to increase again progressively. The speed pattern generator 50 may be constituted by an up-down counter which itself is well known in the art. Concerning the time when the acceleration command and the deceleration command signals are produced, description will be made hereinafter. In FIG. 5, time t is taken along the abscissa.

The arithmetical operation unit 42 further includes an oscillator for producing a sampling pulse signal of a predetermined repetition frequency. The oscillator itself may be constituted by one commercially available.

The arithmetical operation unit 42 is further operated to perform the arithmetic operations which are expressed by equations (2) to (10) described below.

On the basis of the following equation (2), coordinates x, y and z on an orthogonal coordinate system are determined from the values of $\theta$, $\phi$ and $\psi$ available from the position detectors 22, 23 and 24 or from the memory unit 36.

$$\begin{bmatrix} x \\ y \\ z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} \theta \\ \phi \\ \psi \end{bmatrix} \quad (2)$$

In the above expression (2), $a_{11}$–$a_{33}$ represent coefficients determined by the mechanical construction of the apparatus shown in FIG. 1.

On the basis of the following equation (3), the length or distance between the bend points or the distance $l_{n,n+1}$ between the current position of the route-controlled object or point P and the succeeding taught point at which the controlled point P is to be changed in the moving direction thereof or to be stopped is determined, namely:

$$l_{n,n+1} = \sqrt{(x_n - x_{n+1})^2 + (y_n - y_{n+1})^2 + (z_n - z_{n+1})^2} \quad (3)$$

The following equation (4) is used for determining a bend angle $\delta_n$ at a coordinate point $P_n$ (i.e. the angle for which the moving directin of the controlled point P is to be varied at the coordinate point $P_n$).

$$\delta_n = 180° - \cos^{-1}\{(x_{n-1}-x_n)(x_{n+1}-x_n)+(y_{n-1}-y_n)(y_{n+1}-y_n)+(z_{n-1}-z_n)(z_{n+1}-z_n)\} \quad (4)$$

The following equation (5) is used for determining the distance $l_{dn}$ between the taught point $P_n$ and a coordinate point which precedes the bend point $P_n$ and at which the deceleration of the route-controlled object is initiated.

$$l_{dn} = k \cdot \frac{\delta_n}{l_{n,n+1}} \quad (5)$$

In this connection, it is to be noted that the deceleration command signal is applied to the input terminal 52 of the speed pattern generator 50 when the route-controlled point P has reached the point preceding the bend point $P_n$ for the distance $l_{dn}$.

The following equation (6) is used for determining the number $M_{n,n+1}$ of the sampling pulses required for the route-controlled point P to move from the coordinate point $P_n$ to another coordinate point $P_{n+1}$ on the assumption that the route-controlled point P moves for $\Delta l$ during a single sampling period.

$$M_{n,n+1} = \frac{l_{n,n+1}}{\Delta l} \quad (6)$$

The distance $\Delta l$ is a length traced by the route-controlled point P during the single sampling period when the output signal from the speed pattern generator 50 is at the maximum level $E_{max}$.

The following expressions (7), (8) and (9) are used for determining the distances or lengths $\Delta x_l$, $\Delta y_l$ and $\Delta z_l$ for which the route-controlled object or point P moves in the directions X, Y and Z, respectively, for a single sampling period when the output E is produced from the speed pattern generator 50.

$$\Delta x_l = \left( \frac{x_n - x_{n+1}}{M_{n,n+1}} \right) E \quad (7)$$

$$\Delta y_l = \left( \frac{y_n - y_{n+1}}{M_{n,n+1}} \right) E \quad (8)$$

$$\Delta z_l = \left( \frac{z_n - z_{n+1}}{M_{n,n+1}} \right) E \quad (9)$$

The expression (10) is used for determining increments $\Delta\theta_l$, $\Delta\phi_l$ and $\Delta\psi_l$ of the variables $\theta$, $\phi$ and $\psi$ required to displace the route-controlled point P for the distances $\Delta X_l$, $\Delta Y_l$ and $\Delta Z_l$, respectively.

$$\begin{bmatrix} \Delta\theta_l \\ \Delta\phi_l \\ \Delta\psi_l \end{bmatrix} = \begin{bmatrix} a'_{11} & a'_{12} & a'_{13} \\ a'_{21} & a'_{22} & a'_{23} \\ a'_{31} & a'_{32} & a'_{33} \end{bmatrix}^{-1} \begin{bmatrix} \Delta X_l \\ \Delta Y_l \\ \Delta Z_l \end{bmatrix} \quad (10)$$

Figure 7:
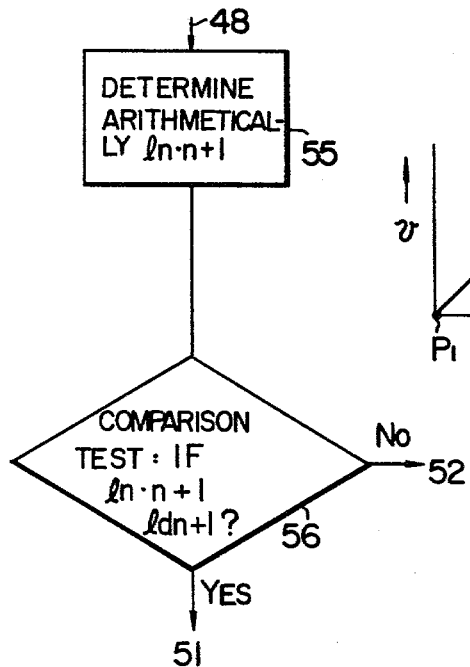
FIG. 7 is a flow chart to illustrate flows of arithmetic operations of an arithmetic operation unit.

Now, it is assumed that the route-controlled point P is currently positioned at a coordinate point $P_1$ and the teaching operation is such that the route-controlled point P is to be moved to coordinate point $P_2$, $P_3$ and $P_4$ in this sequence. Referring to FIG. 7 which illustrates the operations to be performed on the above assumption in a flow chart, a linear distance $l_{1,2}$ between the coordinate point $P_1$ and $P_2$ is arithmetically determined at a step 55 by utilizing data available from the memory unit 36. The calculation for determining the distance $l_{1,2}$ is performed by fetching the fresh outputs from the position detectors 22, 23 and 24 in response to every sampling pulse output from the sampling signal oscillator 54 in the manner described hereinafter.

On the other hand, the inverse number of the angle $\delta_2$ formed between the straight line interconnecting the coordinate points $P_1$ and $P_2$ and the line segment passing the points $P_2$ and $P_3$ (i.e. the bend angle $\delta_2$ at the coordinate point) and the length $l_{2,3}$ of the line segment interconnecting the coordinate points $P_2$ and $P_3$ multiplied by a factor k are used to arithmetically determine a point which preceeds to the coordinate point $P_2$ by a distance $l_{d2}$ and at which the deceleration of the route-controlled object or point P is to be started.

At the step 56, comparison is made between the distances $l_{1,2}$ and $l_{d2}$ in synchronism with the sampling pulse. When it is found that $l_{1,2} > l_{d2}$ as the result of the comparison, the acceleration command signal is applied to the input terminal 51 of the speed pattern generator 50. On the other hand, when $l_{1,2} < l_{d2}$, then the deceleration command is applied to the input terminal 52. In the former case, i.e. $l_{1,2} > l_{d2}$, the output signal E from the speed pattern generator increases progressively toward the saturation level $E_{max}$, as described hereinbefore. When $l_{1,2} < l_{d2}$, then the output signal E decreases toward zero in a step-down manner.

In the meantime, the number $m_{1,2}$ of the sampling cycles is determined in response to the sampling pulses by the arithmetic unit in accordance with the expression (6) as follows:

$$m_{1,2} = \frac{l_{1,2}}{\Delta l}$$

From the results of this computation and the output value E produced from the speed pattern generator, the speed components of the route-controlled point P in the directions X, Y and Z at the time when the corresponding sampling pulse is produced is arithmetically determined in accordance with the equations (7), (8) and (9) by the arithmetical operation unit 42 as follows:

$$\Delta X_{l1\cdot2} = \left(\frac{x_1 - x_2}{m_{1,2}}\right) E$$

$$\Delta Y_{l1\cdot2} = \left(\frac{y_1 - y_2}{m_{1,2}}\right) E$$

$$\Delta Z_{l1\cdot2} = \left(\frac{z_1 - z_2}{m_{1,2}}\right) E$$

Further, the arithmetical operation unit 42 determines the increments $\Delta\theta_{l1,2}$, $\Delta\phi_{l1,2}$ and $\Delta\psi_{l1,2}$ to be effected at the respective sampling pulse from the above $\Delta X_{l1,2}$, $\Delta Y_{l1,2}$ and $\Delta Z_{l1,2}$ in accordance with the equation (10). These increment values are then transmitted to the servo controller 43 which will then move the rotatable table 2, the first arm 6 and the second arm 12 correspondingly in response to the increments $\Delta\theta_{l1,2}$, $\Delta\phi_{l1,2}$ and $\Delta\psi_{l1,2}$.

The route-controlled point P passes by the taught point P$_2$ at a speed determined by the output E produced from the speed pattern generator at that time point. Subsequently, at the step 55 (FIG. 7), the bend angle $\delta_3$ at the coordinate point P$_3$, i.e. the angle formed between the line segment interconnecting the points P$_2$ and P$_3$ and the segment connecting the coordinate points P$_3$ and P$_4$ as well as the length $l_{3,4}$ of the straight line connecting the coordinate points P$_3$ and P$_4$ are arithmetically determined in accordance with the equations (4) and (3).

The linear distance between the current coordinate position of the route-controlled object or point P and the coordinate point next to be passed by the controlled point P, e.g. the linear distance between the coordinate points P$_1$ and P$_2$ is determined in the manner described below. In the first place, the coordinates ($x_1$, $y_1$, $z_1$) of the controlled point P are calculated from the outputs ($\theta_1$, $\phi_1$, $\psi_1$) of the position detectors 22, 23 and 24 (these outputs are changing every moment) in accordance with the equation (1), while the taught information ($\theta$, $\phi$, $\psi$) of the point P$_n$ is read out from the memory unit thereby to determine the coordinates $x_1$, $y_1$ and $z_1$ in accordance with the equation (1).

Next, the distance $l_{1,2}$ is determined in accordance with the equation (3) from the coordinates $x_1$; $y_1$; $z_1$ and $x_2$; $y_2$; $z_2$.

Figure 8:
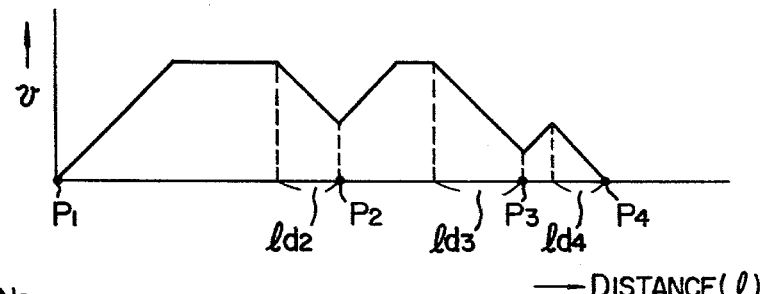
FIG. 8 is a graph showing a relationship between distance and speed when the route-controlled object is moved along a path defined by the bend points shown in FIG. 6.

FIG. 8 illustrates the profile of the speed v of the route-controlled point P taken along the ordinate as the function of the distance or length L from the coordinate point P$_1$ through p$_2$ and P$_3$ to the point P$_4$ taken along the abscissa.

In the foregoing description, the route-controlled object is regarded as the single point P located on the swing axis of the first swing motor 18, it is possible to take a point on the spray gun as the route-controlled object. In this case, the expressions (2) and (10) may be rewritten as follows:

$$\begin{bmatrix} x \\ y \\ z \end{bmatrix} = \begin{bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{bmatrix} \begin{bmatrix} \theta \\ \phi \\ \psi \\ \alpha \\ \beta \end{bmatrix} \quad (2')$$

$$\begin{bmatrix} \Delta\theta_l \\ \Delta\phi_l \\ \Delta\psi_l \\ \Delta\alpha_l \\ \Delta\beta_l \end{bmatrix} = \begin{bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{bmatrix}^{-1} \begin{bmatrix} \Delta X_l \\ \Delta Y_l \\ \Delta Z_l \end{bmatrix} \quad (10')$$

Further, in the foregoing description, it has been assumed that the memory unit 36 is adapted to store the data of the individual bend points in terms of the values of $\theta$, $\phi$ and $\psi$. However, it will be readily appreciated that the values $\theta$, $\phi$ and $\psi$ are transformed into the respective coordinate values (x, y, z) which are then stored in the memory unit.

I claim:

1. An automatic working apparatus comprising a route-controlled object to be controlled in respect of a path along which said object is moved, a base portion, drive means including a plurality of actuator means provided between said route-controlled object and said base portion and capable of moving said route-controlled object sequentially to a plurality of positions in different directions, arithmetical operation control means for arithmetically determining bend angles at bend points to be traced sequentially by said route-controlled object and producing output signals for changing the moving speed of said route controlled object at the time when said route-controlled object passes by said bend point as a function of said bend angle in such manner that said moving speed of said route-controlled object is correspondingly decreased for a relatively greater value of said bend angle, said arithmetical operation control means calculating the bend angle at each bend point and amount of change for respective actuator means to move the route-controlled object to the bend point, said arithmetical operation control means producing an output signal for changing the moving speed of respective actuator means in accordance with the calculated bend angle, the moving speed being the speed at the time when the route-controlled object passes the bend angle, and servo control means for operating respective actuator means of said drive means in response to said output signals from said arithmetical operation control means.

2. An automatic working apparatus as set forth in claim 1, wherein said arithmetical operation control means is so arranged that magnitude of a speed command signal produced when said route-controlled object passes by said bend point is in inverse proportion to the value of said bend angle.

3. An automatic working apparatus comprising a route-controlled object to be controlled in respect of a path along which said object is moved, a base portion, drive means including a plurality of actuator means provided between said base portion and said route-controlled object and capable of moving said route-controlled object sequentially to a plurality of positions in different directions, arithmetical operation control means for arithmetically determining a bend angle at a first one of bend points to be followed sequentially by said route-controlled object and producing an output signal for respective actuator means for changing the moving speed of said route-controlled object at the time when said route-controlled object passes by said first bend point in dependence on a product of said arithmetically determined bend angle and the inverse number of a distance between said first bend point and a second succeeding bend point in such manner that said moving speed of said route-controlled object is correspondingly decreased for a relatively greater value of said product, and servo control means for operating respective actuator means of said drive means in response to said output signals produced from said arithmetical operation control means.

4. An automatic working apparatus as set forth in claim 3, wherein said arithmetical operation control means is so arranged that the magnitude of a speed command signal produced when said route-controlled object passes by said first bend point is in inverse proportion to the value of said product.

5. An automatic working apparatus comprising a route-controlled object to be controlled in respect to a path along which said object is moved, a base portion, drive means including a plurality of actuator means provided between said route-controlled object and said base portion and capable of moving said route-controlled object sequentially to a plurality of positions in different directions, memory means for storing bend points of said path to be traced sequentially by said route-controlled object, attitude detector means for detecting attitudes of respective actuator means of said drive means, arithmetical operation control means responsive to the output signals from said attitude detector means for reading out from said memory means the stored data about the first bend point to be passed by said route-controlled object and the second bend point to be passes by said route-controlled object in succession to said first bend point thereby to arithmetically determine a bend angle at said first bend point and for producing output signals for respective actuator means to vary the speed at which said route-controlled object passes by said first bend point as a function of said arithmetically determined bend angle in such a manner that the speed of the route-controlled object is correspondingly decreased for a relatively greater value of said arithmetically determined bend angle, and servo control means for operating respective actuator means of said drive means in response to said output signals from said arithmetical operation control means.

6. An automatic working apparatus comprising a route-controlled object to be controlled in respect of a path along which said object is moved, a base portion, drive means including a plurality of actuator means provided between said route-controlled object and said base portion and capable of moving said route-controlled object sequentially to a plurality of positions in different directions, memory means for storing bend points of said path to be traced sequentially by said route-controlled object, attitude detector means for detecting positions of respective actuator means, arithmetical control means for reading out from said memory means the stored data about a first bend point to be passed by said route-controlled object and the second bend point to be passed by said route-controlled object in succession to said first bend point thereby to arithmetically determine the shortest distance between said first and second bend points on the basis of said data read out from said memory means and the output signals from said attitude detector means and for producing output signals for respective actuator means to vary the speed at which said route-controlled object passes by said first bend point as a function of a product of said bend angle and the inverse number of said distance in such manner that said speed is correspondingly decreased for a relatively greater value of said product, and servo control means for operating respective actuator means of said drive means in response to said output signal from said arithmetical operation control means.

7. Method of controlling an automatic working apparatus comprising steps of arithmetically determining a bend angle at a first bend point in a path of a route-controlled object of said apparatus to be controlled in respect to said path along which said object is moved from the position data of three positions including a current position of said route-controlled object and said first and a second bend point to be passed by said route-controlled object in succession, and controlling the speed at which said route-controlled object passes by said first bend point as a function of said arithmetically determined bend angle in such manner that said speed is correspondingly decreased for a relatively large value of said bend angle.

8. Method of controlling an automatic working apparatus comprising steps of arithmetically determining a bend angle at a first bend point in a path of a route-controlled object of said apparatus to be controlled in respect of said path along which said object is moved from data about three positions including a current position of said route-controlled object and said first and a second bend point to be passed by said route-controlled object in succession and then arithmetically determining a product of said bend angle and the inverse number of the shortest distance between said first and second bend points, and controlling the speed at which said route-controlled object passes by said first bend point as a function of said product in such manner that said speed is correspondingly reduced for a relatively larger value of said product.

9. A method of controlling an automatic working apparatus as set forth in claim 8, wherein data of said product is stored and read out for a play-back operation to control the speed of said route-controlled object.

10. A method of controlling an automatic working apparatus including a route-controlled object of said apparatus to be controlled in respect of a path along which said object is moved, comprising steps of arithmetically determining a bend angle at a first bend point to be next passed by said route-controlled object from data about three positions including a bend point having been just passed by said route-controlled object and said first and a second bend point to be passed by said route-controlled object in succession, and controlling the speed at which said route-controlled object passes by said first bend point as a function of said arithmetically determined bend angle in such manner that said speed is correspondingly reduced for a relatively greater value of said bend angle.

11. A method of controlling an automatic working apparatus as set forth in claim 10, wherein data about said bend angle is stored and read out for a play-back control to control the speed of said route-controlled object.

* * * * *